(No Model.) 2 Sheets—Sheet 1.
J. VARLEY.
PERSPECTIVE RULER.
No. 410,050. Patented Aug. 27, 1889.
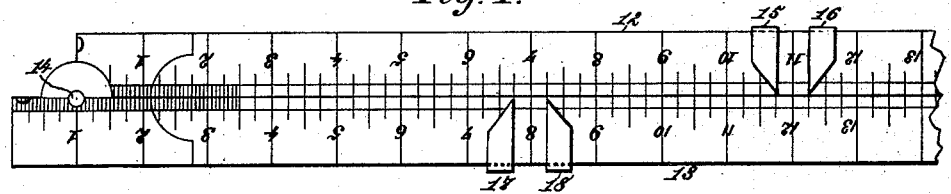
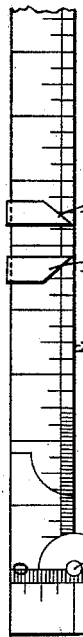
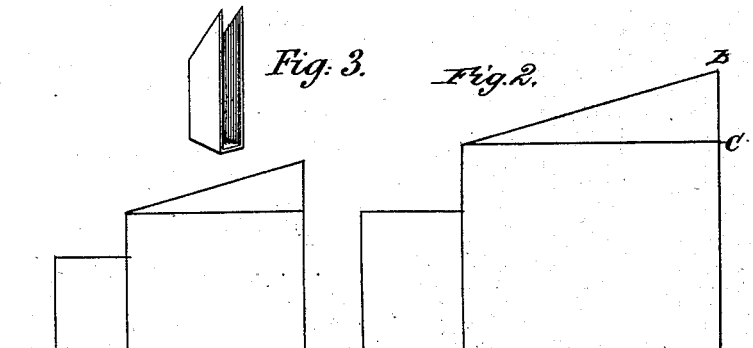
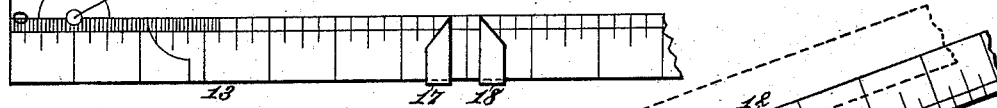
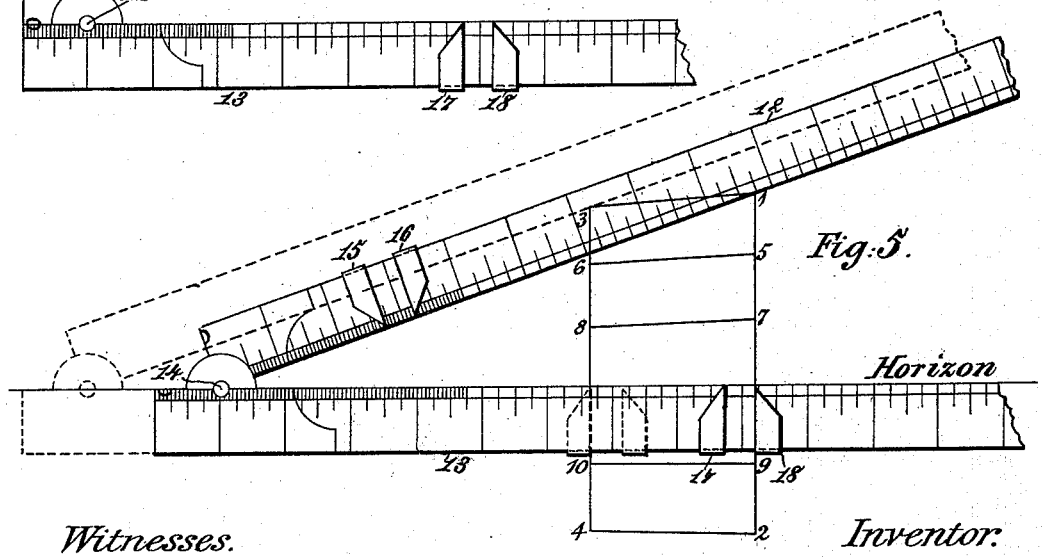
Witnesses.
Dennis Sumby
Robt. Everett
Inventor:
John Varley.
By
James L. Norris.
Atty.

(No Model.)  2 Sheets—Sheet 2.
J. VARLEY.
PERSPECTIVE RULER.
No. 410,050. Patented Aug. 27, 1889.
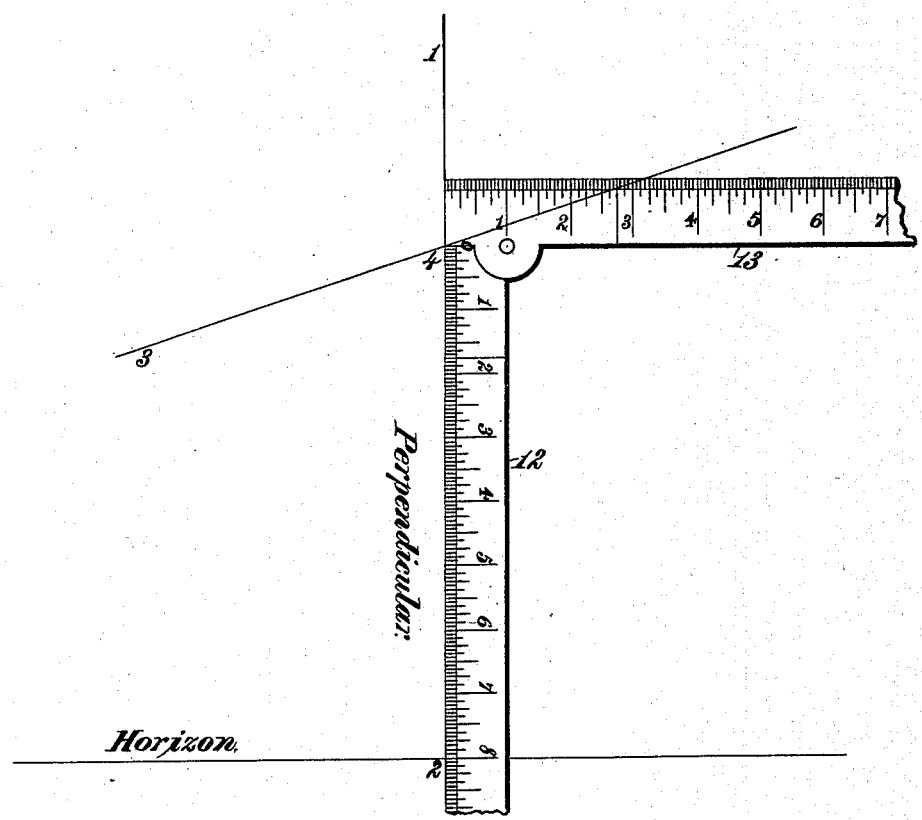
Witnesses,
Robt. Everett.
J. A. Rutherford.
Inventor:
John Varley.
By
James L. Norris.
Atty.

UNITED STATES PATENT OFFICE.

JOHN VARLEY, OF LONDON, COUNTY OF MIDDLESEX, ENGLAND.

PERSPECTIVE-RULER.

SPECIFICATION forming part of Letters Patent No. 410,050, dated August 27, 1889.

Application filed November 16, 1888. Serial No. 291,016. (No model.) Patented in England April 28, 1888, No. 6,318.

*To all whom it may concern:*

Be it known that I, JOHN VARLEY, artist, a subject of the Queen of Great Britain, residing at 10 Abbey Road, St. Johns Wood, in the county of Middlesex, London, England, have invented new and useful Improvements in Perspective-Rulers, (for which I have obained Letters Patent in Great Britain, No. 6,318, dated April 28, 1888,) of which the following is a full, clear, and exact specification.

This invention has for its object to provide a novel ruler that can be employed as a proportional compass to enlarge or reduce drawings to half, three-quarters, or any proportion of their natural size or to any fractional dimension not an aliquot part of their original size.

The invention also has for its object to provide a novel ruler which, the inclination of a line being given, can be used to place all other lines tending to the same vanishing-point in perspective.

The invention also has for its object to provide for a novel ruler which, the distance of a vanishing-point being given, can be employed to draw a line toward it from any point on a given perpendicular.

The invention also has other objects, which will be hereinafter set forth.

The objects of my invention I accomplish by the novel construction and combination of devices hereinafter described and claimed, reference being made to the accompanying drawings, in which—

Figure 1 is a broken side elevation of the ruler folded. Fig. 2 is a diagram hereinafter referred to, illustrating the use of the ruler as a proportional compass. Fig. 3 is a detail perspective view of one of the pointer-slides. Fig. 4 is a broken side elevation showing the ruler opened to a right angle. Fig. 5 is a broken side elevation showing the manner of using the ruler to place all lines tending to the same vanishing-point in perspective. Fig. 6 is a broken side elevation showing the manner of using the ruler to draw a line toward a vanishing-point from any point on a given perpendicular.

In order to enable those skilled in the art to make and use my invention, I will now describe the same in detail, referring to the drawings, wherein—

Numerals 12 and 13 indicate two graduated arms or members, one of which is pivotally connected at its end to the inner edge of the other at a short distance from the end thereof, as at 14, so that one arm is longer than the other, while the two arms when opened to their limit will stop exactly at right angles to each other. The two arms of this jointed rule are each provided with two independent pointer-slides, as at 15 and 16 and 17 and 18, said slides being adapted to be separately slid or adjusted, as occasion may be demanded. The two jointed arms or members being graduated upon both sides for certain uses of the ruler, each of the pointer-slides is preferably composed of a duplex-armed piece of metal or other suitable material, as clearly shown in Fig. 3, to embrace the ruler.

For the purpose of explaining the use of the perspective-ruler as a proportional compass to enlarge or reduce drawings to half, three-quarters, or any other proportion of their natural size, or to any fractional dimension not an aliquot part of their original size, I proceed as follows, reference being made to the diagram, Fig. 2: Take any base-line and any perpendicular to it on the original drawing, as D A and A B, and to reduce the drawing to the proportion of A C to A B mark the point C at the half, three-quarters, or at any arbitrary height required on the perpendicular chosen, and place the inner edge of the lower ruler-arm 13 upon the base-line D A. Now adjust the pointer-slide 18 under the perpendicular A B, close the ruler until the inner edge of the upper ruler-arm 12 touches the point B, and adjust the pointer-slide 16 on the arm 12 so that it touches the point B. The ruler is now shifted (open at the same angle) along the base-line until the inner edge of the ruler-arm 12 touches the point C. Then the pointer-slide 17 is adjusted on the ruler-arm 13 under the perpendicular A B, and the fourth pointer slide 15 is adjusted on the ruler-arm 12 to touch the point C. The distance between the inner edges of the two ruler-arms at the first-mentioned pair of pointer-slides 18 and 16 and that between the inner edges of the other pair 17 and 15 will always be in the same proportion at whatever angle the ruler-arms may be opened to measure by the pointer-slides and transfer lengths and distances from the original to the reduced or enlarged copy.

In another use of the ruler, the inclination of a line being given, to put all other lines tending to the same vanishing-point in perspective, I proceed as follows, referring to Fig. 5: The line 1 3 may represent the inclination of the top of a building toward a vanishing-point somewhere on the horizon, and 1 2 may represent one of the sides. It being, for example, required to draw lines from 5, 7, 9, and 2 in perspective with the line 1 3, place the ruler-arm 13 with its inner edge on the horizon, move the ruler-arm 12 until its inner edge touches the point 1, and adjust the pointer-slide 18 until its point is under the perpendicular falling from 1. Now shift the ruler to the left (see dotted lines) along the horizon, keeping it open at the same angle, until the inner edge of ruler-arm 12 touches the point 3, and place the pointer-slide 17 with its point under the perpendicular falling from 3. The ruler is now moved back to the first position, (shown in full lines,) with pointer-slide 18 on the line 1 2, and the ruler-arm 12 is moved until its inner edge touches the point 5. Then shift the ruler along the horizon, as before, until the pointer-slide 17 is on the line 3 4, and mark where the inner edge of the ruler-arm 12 cuts the perpendicular 3 4, which will be at 6. A line drawn from 5 to 6 will be in true perspective with the line 1 3. The lines 7 8 and all other lines above the horizon are drawn according to the same rule. For lines below the horizon both pointer-slides 17 and 18 are kept in the positions as just previously used and the ruler is turned over, keeping the inner edge of the arm 13 on the horizon. Now close the ruler until the inner edge of the arm 12 touches the point 2. Then, without disturbing said arm 12, shift the ruler, as before explained, until the inner edge of the arm 12 cuts the perpendicular 3 4, which it will do at the point 4. Draw line 4 2 and it will tend to the same vanishing-point as the line 1 3. The line 9 10 is drawn in the same way, and all other lines below the horizon.

In the foregoing operations to put the lines so that they tend to the same vanishing-point in perspective the pointer-slides 15 and 16 are not used, and may be removed or left on the ruler.

In another use of the ruler, the distance of a vanishing-point being given, to draw a line toward it from any point on a given perpendicular, I proceed as follows, referring to Fig. 6: Suppose, for example, twenty-four inches to be the distance of a vanishing-point on the horizon from the point 2 of the perpendicular line 1 2, and it is required to draw a line from 4 which would touch the horizon at a distance of twenty-four inches from the point 2. I open the ruler to its stop, which will be a right angle, and place the other edge of the arm 12 on the perpendicular 1 2, so that the zero or mark 0 touches the point 4 of the perpendicular. The height of the latter from 2 to 4 is in this example shown by the ruler to be eight inches. Now place any straight-edge at the division three inches on the outer edge of the arm 13, so that it also passes over the zero or mark 0 on the outer edge of the arm 12. This will give the inclination of a line drawn from the point 4 to a vanishing-point twenty-four inches from the point 2. In this operation always multiply the height of the perpendicular from the horizon by the quantity on the arm 13, which will produce the distance of the required vanishing-point, as in this example: $8 \times 3 = 24$.

The inclination of any line being given, the vanishing-point can be found as follows: Suppose 4 3 to be the inclination of a line from the perpendicular 1 2 and it is required to find the vanishing-point, or, in other words, at what distance from the point 2 this line would cut the horizon. Place the ruler as described in the example immediately preceding, lay any straight-edge upon the line 4 3, and note what division it cuts upon the outer edge of the arm 13. Multiply this quantity by the height of the perpendicular from the horizon, and the product will give the distance of the vanishing-point of the line 4 3.

For the purposes of my invention the arms of the ruler must be of unequal length—say, one seventeen inches and the other eighteen inches long—and their width should be exactly one inch.

The perspective-ruler is useful for many other purposes not necessary to specifically mention; and by it painters, architects, and draftsmen can avoid the inconvenience of using long straight-edges, threads, cords, and similar means in working out and putting in the true perspective of their drawings, and can also avoid piercing or otherwise disfiguring their drawings.

Having thus described my invention, what I claim is—

1. A perspective-ruler consisting of two graduated arms, one of which is pivotally connected at one extremity with the inner edge of the other at a short distance from the extremity thereof, so that they can open at a right angle, and a pair of independently-movable pointer-slides on one of such pivoted arms, substantially as described.

2. A perspective-ruler consisting of two arms, one of which is pivotally connected at one extremity with the inner edge of the other at a short distance from the extremity thereof, and a pair of independently-adjustable pointer-slides on each pivoted arm, substantially as and for the purposes described.

In testimony whereof I have signed my name, in presence of two subscribing witnesses, this 24th day of October, 1888.

JOHN VARLEY.

Witnesses:
 W. H. SMITH,
  68 *Fleet Street, London.*
 WALTER J. SKERTEN,
  17 *Gracechurch Street, London, E. C.*